United States Patent [19]

Pirovano

[11] Patent Number: 5,062,741
[45] Date of Patent: Nov. 5, 1991

[54] CABLE WITH RADIAL ELEMENTS FOR CONVEYING MATERIALS BEHAVING AS FLUIDS THROUGH DUCTS

[76] Inventor: Camillo Pirovano, Località Cavigiolo, 22052 Cernusco Lombardone (Como), Italy

[21] Appl. No.: 507,780

[22] Filed: Apr. 12, 1990

[30] Foreign Application Priority Data

Apr. 14, 1989 [IT] Italy ................. 20147 A/89

[51] Int. Cl.⁵ ............................................. B65G 53/40
[52] U.S. Cl. ........................................ 406/76; 406/81; 198/716
[58] Field of Search ..................... 198/716; 406/76, 81

[56] References Cited

U.S. PATENT DOCUMENTS 2,586,538  2/1952  Hapman ............................. 198/716
3,216,553  11/1965  Leach ................................. 198/716

FOREIGN PATENT DOCUMENTS 156419  10/1985  European Pat. Off. .......... 198/716
190259  12/1966  U.S.S.R. ............................. 198/716
591363  2/1978  U.S.S.R. ............................. 198/716

Primary Examiner—Joseph F. Peters, Jr.
Assistant Examiner—Christopher P. Ellis
Attorney, Agent, or Firm—Finnegan, Henderson, Farabow, Garrett & Dunner

[57] ABSTRACT

Apparatus for conveying materials behaving substantially as fluids through ducts comprising a cable having a plurality of radially protruding spaced elements molded on it in such a way that each incorporates the protruding ends of a pin radially passing through the cable. The pins act, in cooperation with a swelling of the cable due to the penetration of the pin, to prevent the elements from sliding along the cable. The molded elements are also provided, with tapered extensions in the axial direction of the cable to avoid sharp variations in the rigidity of the cable.

8 Claims, 1 Drawing Sheet

CABLE WITH RADIAL ELEMENTS FOR CONVEYING MATERIALS BEHAVING AS FLUIDS THROUGH DUCTS

BACKGROUND OF THE INVENTION

There are known cables having a plurality of equally spaced apart radial elements secured thereto, which act as apparatus for conveying materials behaving substantially as fluids through ducts, in which the cable slides through a tube.

The cables normally used are of the metal wire type and consequently have a relatively discontinuous surface, due to the fact that they are formed by twisting the strands together. Disks, or similar conveying elements, are molded from plastic onto the cable and are therefore relatively firmly secured, especially if they have a relatively wide base, so as to cover a reasonably long section of the cable. However, the sudden change in the rigidity of the cable, caused by the present of the disk, gives rise to problems in the case of cable paths with a large number of curves or with curves having a relatively small radius, as is often necessary in complex systems.

Due to the intrinsic relative rigidity of metal wire cables it is, in fact, necessary for the curves in the system to be made with a relatively wide radius in order to avoid excessive bending stress.

In cable conveying system it would sometimes also be desirable to use radial elements which are asymmetrical or off center with respect to the cable. This requirement however conflicts with the torsional resistance of the metal cable, which prevents the elements secured to it from moving along the path according to the curves and the positions of the return pulleys.

All this makes it highly desirable to use textile cables made of high-strength materials, such as those made available by current technologies. Their flexibility, flexural and tensile strength and tendency to accept axial torsion prove, in fact, to be highly satisfactory.

However, the relatively continuous surface of these cables makes the problem of firmly securing the disks, or the like, to the cable extremely difficult.

Moreover, cables made of textile fiber tend to become frayed when their surface threads snap as a result of mechanical stress and especially wear. This problem can be eliminated by using a continuous sheath of flexible material, with high abrasion resistance, which surrounds the cable and also protects it from becoming impregnated with the conveyed material. The use of a sheathed cable makes it practically impossible to firmly secure the disks molded onto it, or secured to it by conventional methods, with the result that up till now it has not been possible to currently and satisfactorily use these cables in conveying systems, despite the fact that their mechananical properties can be considered to be ideal for this use, especially in terms of smoothness and durability.

In the known technique, various possible solutions have been proposed for securing the radial elements to the cable, such as for example the one described in the Italian patent application No. 20245 A/84 on behalf of the same Applicant.

The known coupling means made to date however are still unsatisfactory since they are either unreliable or excessively complicated and therefore expensive to make, especially in view of the usually considerable length of the cable and of the large number of conveying elements secured to it and, moreover, the need to avoid introducing causes which could lead to fraying and snapping of the cable.

The general scope of this invention is to obviate the aforementioned problems by providing a cable, in particular for a system of the type described above, in which the conveying elements can be reliably, inexpensively and rapidly secured to any type of cable whatsoever, especially cables made of textile fiber and sheathed.

SUMMARY OF THE INVENTION

This scope is achieved according to the invention by providing an apparatus for conveying materials behaving substantially as fluids through ducts comprising a cable having a plurality of radially protruding interspaced elements, characterized by the fact that said elements incorporate a section of the cable and the protruding ends of a rivet passing radially through said section of the cable.

BRIEF DESCRIPTION OF THE DRAWINGS

The innovatory principles of this invention and its advantages with respect to the known technique will be more clearly evident from the following description of a possible exemplificative embodiment applying such principles, with reference to the accompanying drawings, in which.

DETAILED DESCRIPTION OF THE INVENTION

Figure 1:
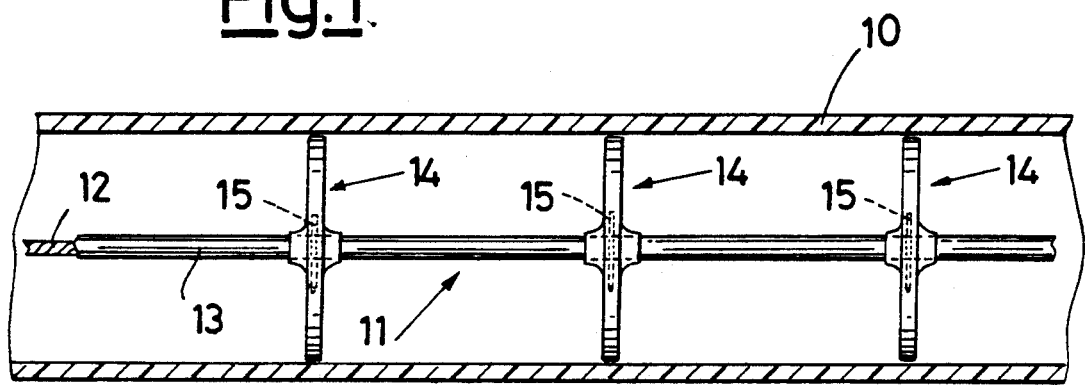
FIG. 1 shows a partial cross-sectional view of a cable according to the invention, inside a duct.

With reference to the figures, as shown in FIG. 1, a cable 11, sliding axially through a duct 10 of a known distribution system, is advantageously composed of a rope core 12, if necessary covered with a plastic sheath 13 made of non-toxic material (for example, polyester), so as to protect the fibers of the rope from abrasion caused by the conveyed material.

The cable is provided with a plurality of spaced conveying elements or disks 14.

Figure 2:
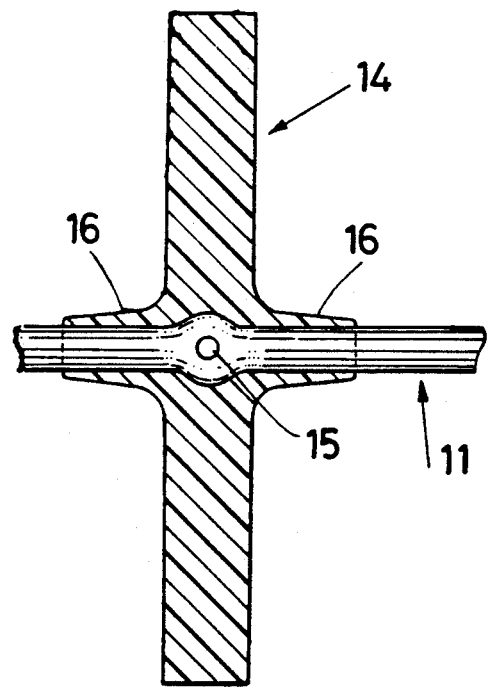
FIG. 2 shows a cross-sectional view of a coupling between the cable and a conveying element made according to the invention.
Figure 3:
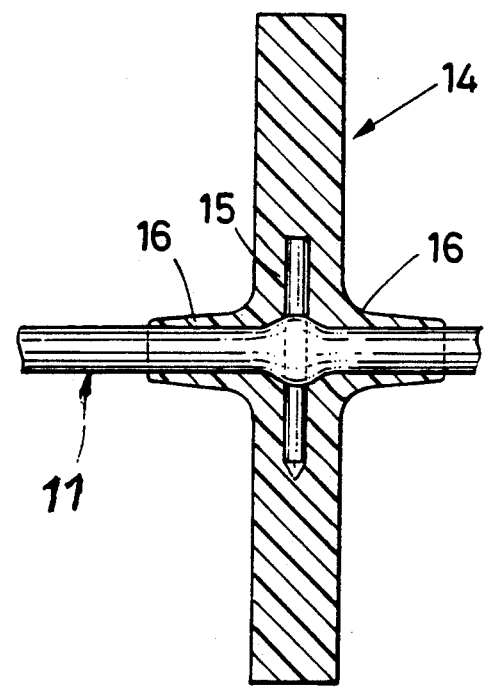
FIG. 3 shows a further cross-sectional view of a coupling between the cable and a conveying element made according to the invention.

As can be more clearly seen in FIGS. 2 and 3, the disks 14 are molded onto the cable so as to incorporate or completely embed rivets or pins 15, which are inserted radially into the cable in such a way that their ends protrude by a sufficient length to prevent the disk from slipping. The disk is molded, in correspondence with a rivet, so as to incorporate the entire corresponding portion of the cable.

Advantageously, the diameter of the rivet is sufficiently large, with respect to that of the cable, as to cause a local enlargement of the section of the cable, as shown in FIG. 2.

In this way the rivet and the swelling in the cable co-operate to ensure that the molded disk is reliably locked in place.

Each disk 14 has two extensions 16 disposed substantially coaxial with the cable and covering a portion of the cable beyond the swelling.

The extensions gradually taper off from the disk, so as have decreasing rigidity, thus preventing sudden changes in the rigidity of the cable between its free portions and the portions made rigid by the presence of the disk, and abnormal areas in which fatigue failure could occur.

Moreover, the fibers of the cable affected by the penetration of the rivet are protected by the presence of the disk, which causes local stiffening of the cable thus avoiding stress, and especially fatigue stress, in this area of the cable where the fibers may have suffered damage due to penetration of the rivet.

It is clear therefore that obtaining a cable, according to the invention, with conveying elements secured thereto (which are described herein as disks but which can obviously be of any desired shape, even off center, in order to adapt to particular types of ducts) is quick and simple and consists of simply inserting rivets into the cable at regular intervals, for example by means of an automatic riveting machine, and of subsequently molding the conveying elements 14, according to known techniques, so as to incorporate or embed the rivets in the elements.

Various types of materials can be used. For example, the rope core of the cable can be made of nylon, while the disks can be molded from hard plastic.

Despite the fact that it is extremely simple and inexpensive to make, the coupling thus obtained is able to withstand considerable stress, far higher than that normally incountered in prior distribution systems of the aforementioned type.

I claim:

1. In a conveyor apparatus for conveying materials behaving substantially like fluids through a tubular duct with a flexible cable having a plurality of conveying elements extending substantially radially therefrom and fixed along the length thereof at spaced intervals, the improvement comprising a plurality of spaced pins that pass through the cable with either end thereof protruding radially outward from the cable in opposite directions, and a plurality of conveying elements, each of which is molded in place around a pin and the adjoining portions of the cable so as to completely embed the pin within the element.

2. The conveyor apparatus of claim 1, wherein the size of the pins causes a swelling of the flexible cable in the area of the cable where it passes through it, said swelling also being embedded in the conveying elements.

3. The conveyor apparatus of claim 1, wherein the conveyor elements have integrally molded therewith two extensions that extend outwardly in the axial direction of the cable from and surround the cable in the portions immediately adjacent to either side of the elements.

4. The conveyor apparatus of claim 3, wherein the extensions taper inwardly toward the cable as they extend outwardly from the elements.

5. The conveyor apparatus of claim 1, wherein said flexible cable comprises a core of braided textile fibers covered with a continuous flexible sheath, the pins penetrating through said sheath and core with the elements being molded around said sheath.

6. The conveyor apparatus of claim 5, wherein said fibers are of nylon.

7. The conveyor apparatus of claim 6, wherein said elements are molded from a hard plastic material.

8. The conveyor apparatus of claim 1, wherein said elements are in the form of circular disks.

* * * * *